US006308482B1

(12) United States Patent
Strait

(10) Patent No.: US 6,308,482 B1
(45) Date of Patent: Oct. 30, 2001

(54) REINFORCED ROOF UNDERLAYMENT AND METHOD OF MAKING THE SAME

(76) Inventor: Mark C. Strait, 1296 Patricia Ave., Simi Valley, CA (US) 93065

(*) Notice: Subject to any disclaimer, the term of this patent is extended or adjusted under 35 U.S.C. 154(b) by 0 days.

(21) Appl. No.: 09/525,422

(22) Filed: Mar. 15, 2000

Related U.S. Application Data
(60) Provisional application No. 60/124,347, filed on Mar. 15, 1999.

(51) Int. Cl.$^7$ ........................................... E04B 7/00
(52) U.S. Cl. ..................... 52/408; 428/57; 525/240
(58) Field of Search ...................... 52/408, 515, 518, 52/454; 428/353, 354, 355 EP, 57, 236; 825/240

(56) References Cited

U.S. PATENT DOCUMENTS

| | | | |
|---|---|---|---|
| 3,663,350 | * | 5/1972 | Stokes ................................. 52/309.1 |
| 4,585,682 | * | 4/1986 | Colarusso et al. ...................... 428/57 |
| 5,523,357 | * | 6/1996 | Peterson ................................ 525/240 |
| 5,593,766 | * | 1/1997 | Woiceshyn ............................ 428/236 |
| 5,843,554 | | 12/1998 | Katz . |
| 5,979,133 | * | 11/1999 | Funkhouser ............................ 52/408 |

* cited by examiner

Primary Examiner—Richard Chilcot
(74) Attorney, Agent, or Firm—Price and Gess

(57) ABSTRACT

A reinforced roofing underlayment positioned between a roof support structure and an overlayment in order to provide a waterproof barrier for the roof structure. The roofing underlayment including an interwoven scrim comprising a mesh of interwoven strands of thermoplastic having a tensile strength sufficient to resist tearing when exposed to tensile loads from various directions. The interwoven scrim having a layer of waterproof material affixed to at least one side of the scrim in order to provide a weather-resistant barrier which prevents moisture and other external elements from passing through the roofing underlayment. The waterproof material is preferably a layer of thermoplastic film which is co-extruded over both sides of the scrim. The roofing underlayment may also include a slip-resistant outer surface in order prevent a person installing the roofing underlayment from slipping while walking on the roofing underlayment. Furthermore, the roofing underlayment may include a radiant barrier for reflecting solar energy and thereby reducing the transmission of radiant heat through the roofing underlayment. The configuration of the present invention provides a reinforced roofing underlayment having an increased tensile strength to resist tearing as well as an increased resistance to deterioration from exposure to external elements.

34 Claims, 4 Drawing Sheets

REINFORCED ROOF UNDERLAYMENT AND METHOD OF MAKING THE SAME

CROSS-REFERENCE TO RELATED APPLICATIONS

This application is a continuation of provisional application Ser. No. 60/124,347 filed Mar. 15, 1999 for Reinforced Roof Underlayment.

BACKGROUND OF THE INVENTION

1. Field of the Invention

The present invention relates generally to a weather-resistive barrier for a roofing structure, and specifically to a reinforced roof underlayment having an improved strength and durability to provide a waterproof layer resistive to deterioration from external elements.

2. Description of Related Art

Roofing structures for buildings typically include an underlayment positioned between a roof support deck and an overlayment. The overlayment, such as asphalt shingles, tiles, wooden shakes, slate tiles, metal roofing, or the like, is intended to provide protection from external weather conditions like wind, rainwater, and snowmelt. In order to further protect against moisture and other elements which may pass under the overlayment, the underlayment is installed over the roof deck and under the overlayment to provide an added waterproof barrier. The additional moisture protection provided by the underlayment is particularly necessary with tile roofs, where gaps often exist between the tiles where moisture can pass through. The underlayment also serves the function of providing a seal around roofing fasteners used to affix the tiles to the roof support deck.

Underlayments have conventionally been produced by coating a layer of organic paper with a certain density of asphalt. Over time, the underlayment is exposed to moisture and other external elements which gather underneath the overlayment. This exposure to external elements causes the organic paper-based underlayments to weather and deteriorate over time, especially in tile roofs where gaps between the tiles can expose the underlayment to larger amounts of external elements. Furthermore, constant exposure to sunlight coupled with heat rising from within the building often results in the roofing structure being exposed to high temperatures which can dry out and further deteriorate the underlayment. The deterioration of the underlayment allows moisture to pass through the underlayment and leak through the roof structure, resulting in damage to the interior of the building. The integrity of the roof structure is often dependent upon the very effectiveness of the underlayment. In attempting to utilize existing organic paper-based underlayments in tile roofs, it has been found that the underlayments deteriorate much more quickly than the tile overlayment. Thus, the effectiveness of the waterproof barrier provided by the roofing structure is often limited to the life of the underlayment.

Another problem with existing underlayments being formed from an organic, paper-based material is that the underlayments are flexible and require a solid support structure beneath them. When these organic paper-based underlayments are used with spaced support structures, such as spaced rafters, the underlayments will drape between the rafters to which the underlayment is attached. When moisture gathers underneath the overlayment, it will tend to congregate in the draped portions of the underlayrnent between the rafters. This moisture creates tension on the underlayment in the draped portions as well as the points on underlayment where it is attached to the rafters, where it has been found that the organic paper-based underlayments tend to tear when the tension becomes too great in these locations from excess moisture accumulating. The resistance of the underlayment to tearing is further weakened by the above-described deterioration of the underlayment over time. Thus, organic underlayments have been found to be ineffective in providing a waterproof barrier when used with non-solid support structures.

There is a clearly need for a roofing underlayment having an improved resistance to deterioration from exposure to external elements. Moreover, there is a need for a tear-resistant roofing underlayment having an improved longevity which closely matches that of the overlayment.

OBJECTS AND SUMMARY OF THE INVENTION

It is a primary object of the present invention to overcome the aforementioned shortcomings associated with the prior art.

The present invention provides a reinforced roofing underlayment having an improved resistance to deterioration from external elements.

The present invention provides a reinforced roofing underlayment having an improved tensile strength to resist tearing from forces applied to the underlayment in a variety of directions.

The reinforced roofing underlayment of the present invention improves the weather-resistant barrier provided to a roofing structure in which the underlayment is utilized by improving the longevity of the roofing underlayment to more closely match that of an overlayment positioned over the roofing underlayment.

These as well as additional advantages of the present invention are achieved by providing a reinforced roofing underlayment having an interwoven scrim with at least one layer of waterproof material affixed thereto. The scrim comprises a mesh of interwoven strands of thermoplastic having a tensile strength sufficient to resist tearing when exposed to tensile loads from various directions. The layer of waterproof material is affixed to at least one side of the scrim in order to provide a weather-resistant barrier which prevents moisture and other external elements from passing through the roofing underlayment. The waterproof material is preferably a layer of thermoplastic film which is coextruded over both sides of the scrim. The roofing underlayment is positioned between a roof support structure and an overlayment in order to provide a waterproof barrier for the roof structure.

The roofing underlayment may also include a slip-resistant surface in order to prevent a person installing the roofing underlayment from slipping while walking on the roofing underlayment. Furthermore, the roofing underlayment may include a radiant barrier for reflecting solar energy and thereby reducing the transmission of radiant heat through the roofing underlayment, where the radiant barrier also improves the fire resistance of the roofing underlayment. The roofing underlayment further allows for the passive ventilation of air to pass through the roof structure while providing a waterproof barrier. The advantages associated with the reinforced roofing underlayment of the present invention are achievable when used in conjunction with any type of roof support structure or overlayment.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a reinforced roof underlayment having an improved strength and durability.

Figure 1:
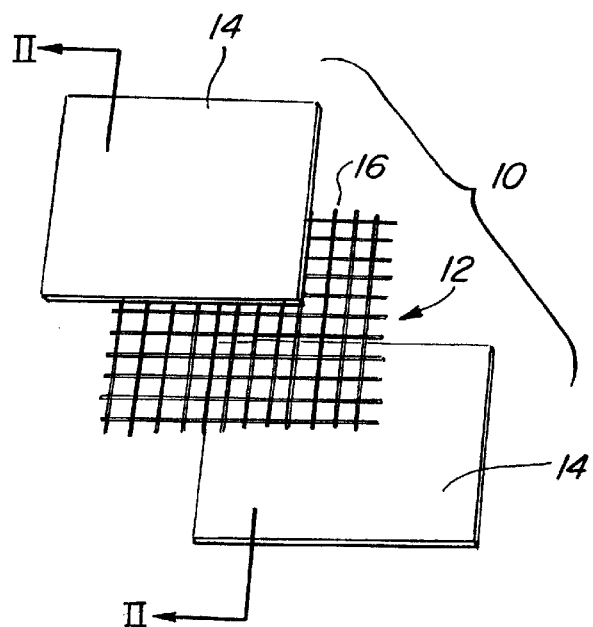
FIG. 1 is an exploded, perspective view of a preferred embodiment of the reinforced roofing underlayment of the present invention.
Figure 2:
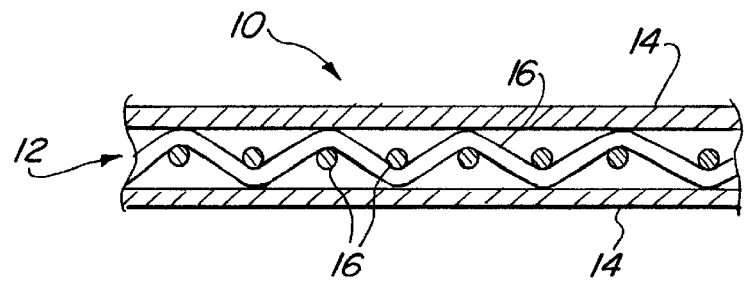
FIG. 2 is an enlarged, fragmentary, cross-sectional view of a preferred embodiment of the reinforced roofing underlayment taken generally along lines II—II of FIG. 1.

Referring now to FIG. 1, an exploded, perspective view of a preferred embodiment of the reinforced roofing underlayment 10 of the present invention is illustrated. The underlayment 10 includes a reinforcing scrim 12 having a layer of waterproof material 14 affixed to at least one of its sides, where layers of waterproof material 14 are preferably affixed to both sides of the reinforcing scrim 12 in a preferred embodiment of the present invention. The reinforcing scrim 12 is formed of a mesh of individual, interwoven strands 16 of material having a tensile strength sufficient to resist tearing when exposed to tensile loads from various directions. The interwoven strands 16 of the reinforcing scrim 12 are preferably formed of a thermoplastic polymer, such as polypropylene, polyethylene, polyester, nylon or other similar material. The strands 16 are interwoven together as shown in FIG. 2 by way of example in order to provide a reinforcing scrim 12 having an improved tensile strength not achievable with a solid film of material, where the orientation of the thermoplastic strands 16 may be selected to optimize their tensile strength. The strands 16 may comprise any cross-sectional shape and size, depending upon the desired tensile characteristics of the scrim 12. By way of example, the strands 16 may be interwoven fibers as shown in FIG. 2, may be cross-laminated polyethylene tape, or may include any other interwoven configuration.

The layers of waterproof material 14 affixed to both sides of the reinforcing scrim 12 provide a weather-resistant barrier which prevents moisture and other external elements from passing through the roofing underlayment 10. The waterproof material 14 is preferably a layer of thermoplastic film which is extruded over each side of the scrim 12, so that the reinforcing scrim 12 is sandwiched between the two thermoplastic layers 14. The roofing underlayment 10 will be described as preferably having a thermoplastic layer 14 positioned over each side of the reinforcing scrim 12. However, it is understood that certain applications may allow the reinforcing scrim 12 to have only one of its sides coated with a thermoplastic layer 14. The thermoplastic film 14 may include polyethylene, polypropylene, or other similar thermoplastic polymers. The roofing underlayment 10 is preferably formed by co-extruding layers of thermoplastic film 14 over the reinforcing scrim 12, but it is understood that the thermoplastic layers 14 may be affixed to the reinforcing scrim 12 using an adhesive or any other manner of attachment. The thermoplastic layers 14 may be variably pigmented to allow the color of the thermoplastic layers 14 to be selected based upon a particular requirements. The thickness of the thermoplastic layers 14 is selected such that the roofing underlayment 10 is flexible, whereby the flexible nature of the roofing underlayment 10 allows it be formed into rolls and easily installed by simply unrolling the roofing underlayment 10 over a roof support structure.

Figure 3:
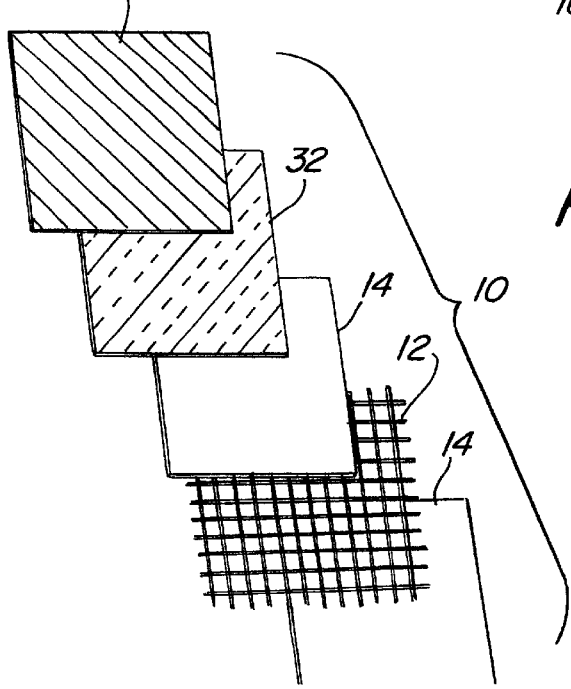
FIG. 3 is an exploded, perspective view of another preferred embodiment of the reinforced roofing underlayment of the present invention.

Another preferred embodiment of the roofing underlayment 10 includes a slip-resistant surface 30 positioned over the outer surface of the roofing underlayment 10 in order to prevent a person from slipping while moving about on the roofing underlayment, as shown in FIG. 3 in an exploded, perspective view of the roofing underlayment. The slip-resistant surface 30 is preferably formed of a sheet of woven polypropylene, since this material remains slip resistant while wet or dry. However, other similar materials providing adequate protection against slipping may also be utilized.

FIG. 3 further illustrates that a radiant barrier layer 32 may also be included in the roofing underlayment 10 in order to reflect solar energy and thereby reduce the transmission of radiant heat through the roofing underlayment 10. The radiant barrier layer 32 preferably comprises a metalized layer, such as a layer of aluminum foil or the like. The radiant barrier layer 32 may be affixed to the roofing underlayment 10 in any number of manners, such as by laminating the metalized layer to another layer, fastening the metalized layer through a vacuum metalized process, or other similar manners for attaching metalized layers. The radiant barrier layer 32 may be positioned at any point within the arrangement of layers in the roofing underlayment 10 other than in between the two thermoplastic layers 14 where it could serve as a conductor. The location of the radiant barrier layer 32 depicted in FIG. 3 is merely one exemplary position within the roofing underlayment 10. The standards of emissivity and reflectivity set forth in procedure ASTM E-408 of the American Society of Testing Materials are satisfied by the radiant barrier layer 32 of the present invention. By reducing the transmission of radiant heat through the roofing underlayment 10, the energy costs for cooling the building under the roof structure can be reduced. The radiant barrier layer 32 also serves to improve the fire resistance of the roofing underlayment 10.

Figure 4A:
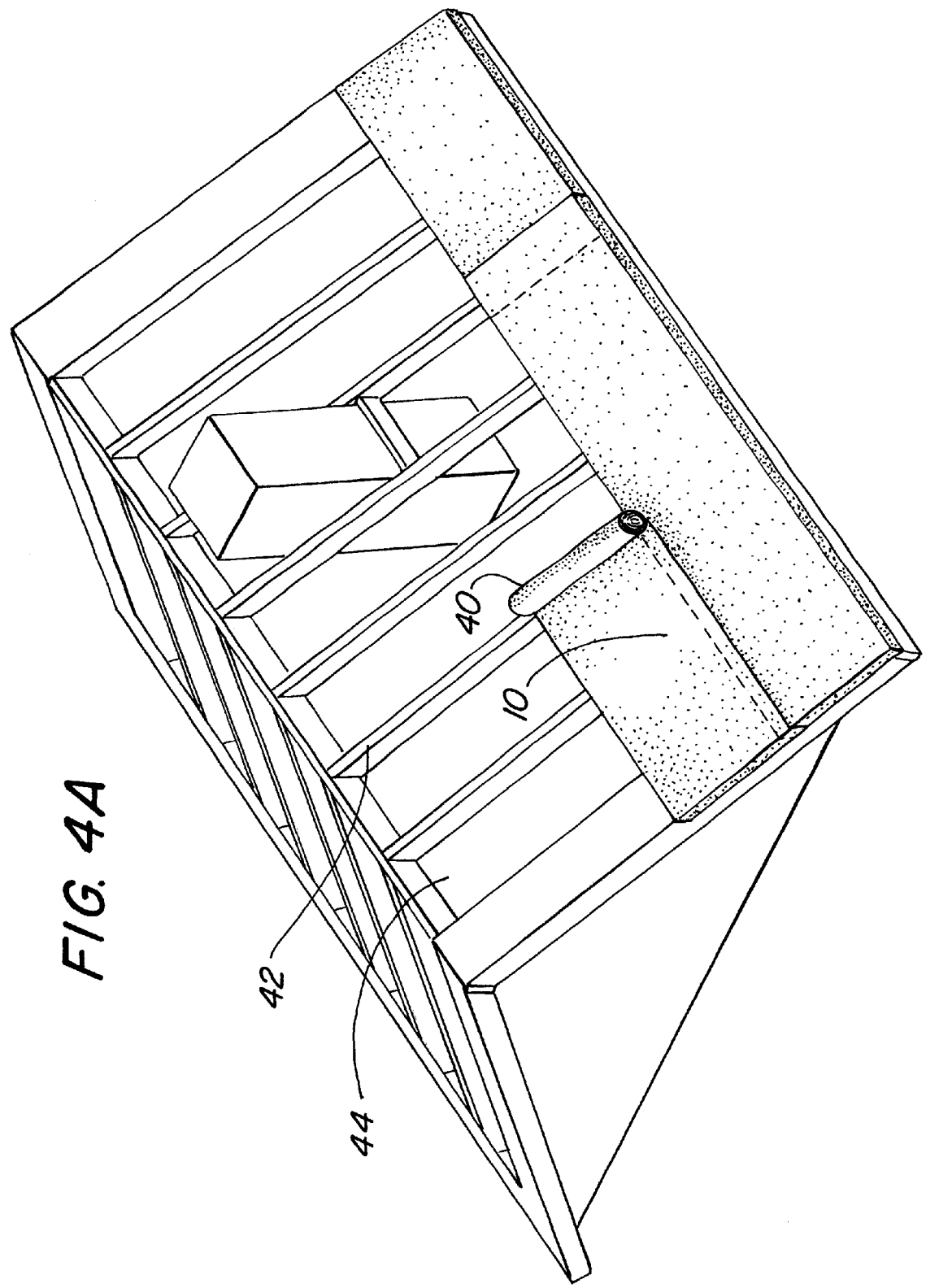
FIG. 4A is a perspective view of the reinforced roofing underlayment being installed on an exemplary roof structure in accordance with present invention.
Figure 4B:
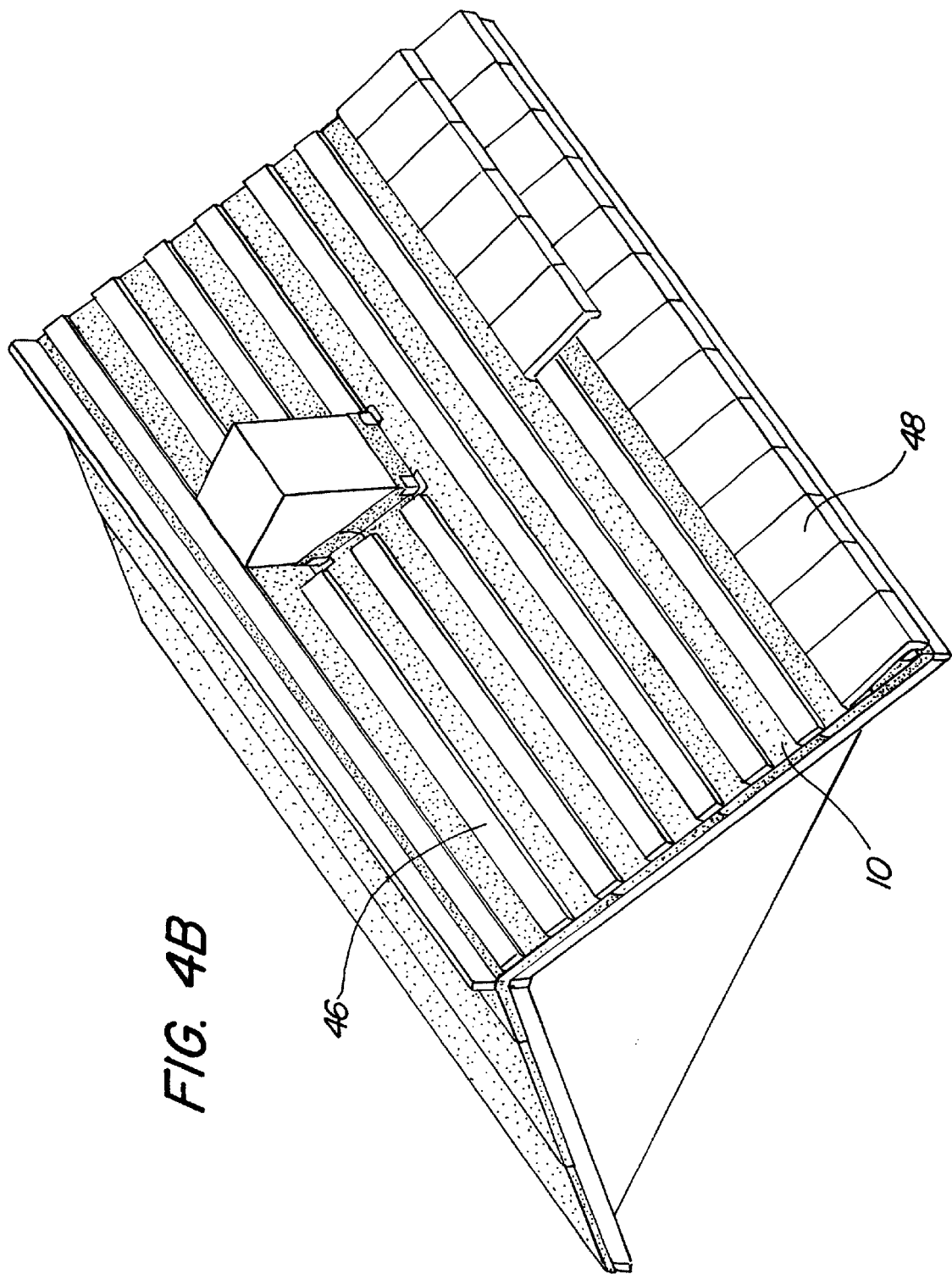
FIG. 4B is a perspective view showing the reinforced roofing underlayment of FIG. 4A in a later stage of the installation process.
Figure 5:
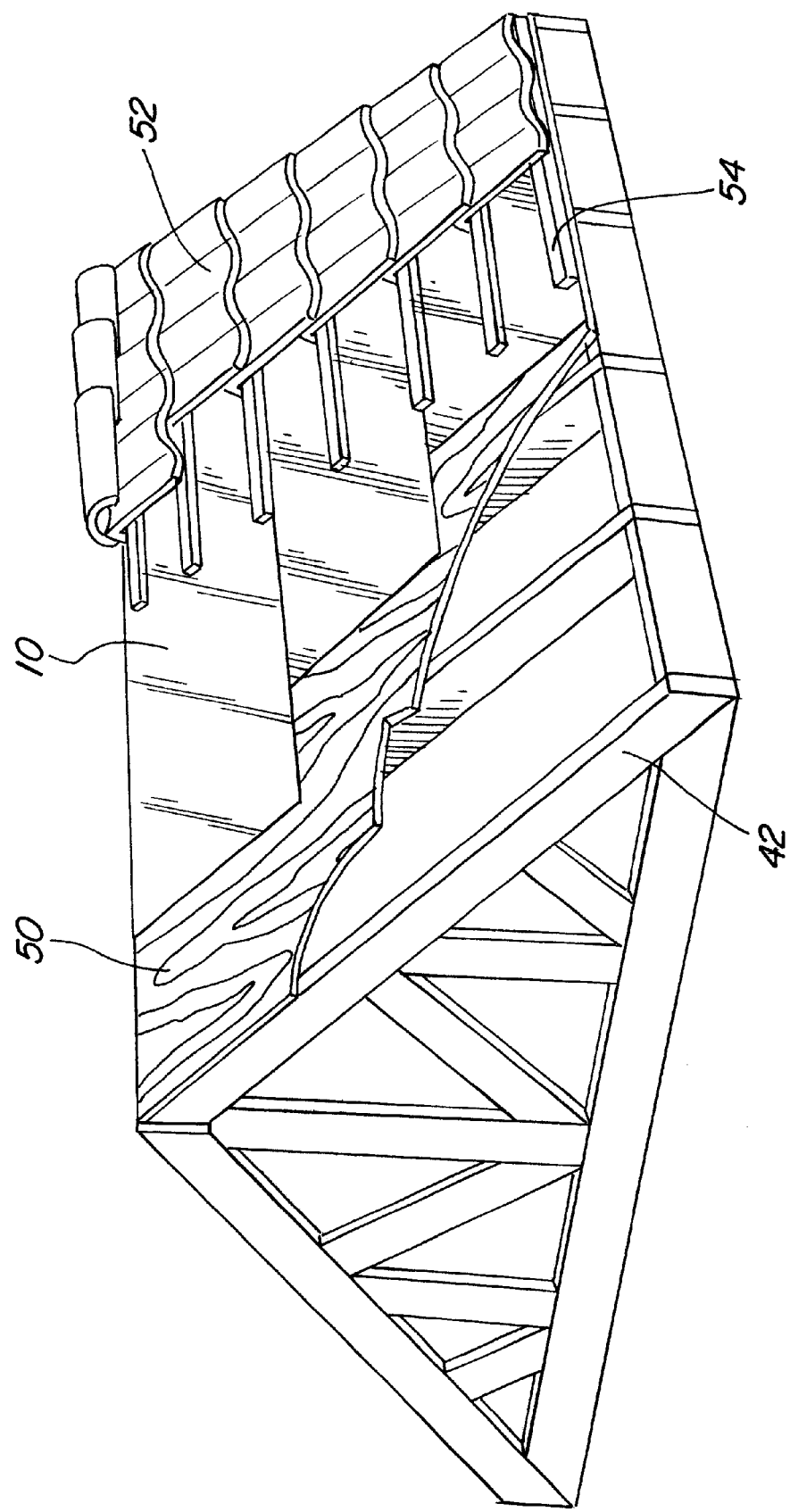
FIG. 5 is a cutaway, perspective view of the reinforced roofing underlayment of the present invention being installed on another exemplary type of roof structure.

The roofing underlayment 10 is installed between a roof support structure and an overlayment in order to provide a waterproof barrier for the roof structure. A perspective view of the roofing underlayment 10 being installed on an exemplary roof structure in accordance with present invention is shown in FIG. 4A. As shown, the flexible roofing underlayment 10 may be formed into rolls 40 which can be simply unrolled over the roof support 42 to allow for easy installation. In this exemplary roof structure, the sarking method is utilized where the roofing underlayment 10 is fastened to the top side of the roof rafters 42 and allowed to drape between the open rafter bays 44. The roofing underlayment 10 is preferably mechanically fastened to the roof rafters 42 using nails or screws, but it is understood that the roofing underlayment 10 may be affixed to the roof rafters 42 using adhesives or other possible attachment methods. Battens 46 are then fastened over the roofing underlayment 10 and into the top side of the roof rafters 42, where the overlayment 48 is then attached to the battens 46, as shown in FIG. 4B. The sarking method is merely one possible manner of installing a roof structure using the roof underlayment 10 of the present invention, where it is the intention of the inventor of the present invention to be able to utilize the roof underlayment 10 with any possible roof structure. For instance, the roof support 42 on which the roof underlayment is attached may include solid sheathing or spaced sheathing. Further, any type of batten structure may be attached to the roofing underlayment 10 for supporting the overlayment 48, such as wood battens, steel battens, plastic battens, counter-battens made from any of these materials, or the overlayment 48 may be attached directly to the roof support 42 through the underlayment 10. FIG. 5 illustrates an exemplary, partial cutaway, perspective view of the roofing underlayment 10 being installed on solid sheathing 50 with a tile overlayment 52 attached to battens 54. These exemplary roof structures are merely described for illustrating possible manners in which the roofing underlayment 10 of the present invention may be incorporated into various roofing structures. It is understood that the roofing underlayment 10 may be positioned under any type of overlayment, including but not limited to all types of tiles, shingles, shakes, and metal roofing.

Another preferred embodiment of the roofing underlayment 10 of the present invention allows for the passive ventilation of air to pass through the roof structure while still providing a waterproof barrier for the roof structure. In order to provide this passive ventilation, the various layers of the roofing underlayment 10 may be formed with microperforations with dimensions which allow the passage of air therethrough while being sufficiently small so as to prevent moisture from traveling therethrough. Alternatively, the roofing underlayment 10 may be incorporated into a roof structure having ventilation openings at predetermined points in the roof structure, such as at the ridgeline or eveline of the roof, that allow air to passively ventilate therethrough.

As can be seen from the foregoing, by forming the roofing underlayment 10 in accordance with the present invention, the roofing underlayment 10 possesses an improved strength and durability which increases the longevity of the roofing underlayment 10. Prior organic paper underlayments tended to deteriorate much more quickly than the other components in the roof structure, so that the integrity of roof structure would depend upon the lifetime of the underlayment. The roofing underlayment 10 of the present invention is preferably formed from a plurality of thermoplastic layers having an improved resistance to deterioration from exposure to external elements, such as moisture and dirt, so that the roofing underlayment 10 of the present invention has an improved durability and longevity. Furthermore, employing reinforced scrim 12 in the roofing underlayment 10 provides an improved tensile strength capable of being walked upon without tearing when being installed on the roof. The reinforced scrim 12 further provides improved strength to resist tearing when exposed to external forces, such as collected moisture, wind, and other external forces. As can be seen, the improved resistance to deterioration and tearing provided by the reinforced roofing underlayment 10 of the present invention improves the integrity and effectiveness of the weather-resistant barrier provided by the roofing underlayment 10. By improving the longevity of the waterproof integrity of roofing underlayment 10 to more closely match the integrity of the more durable components in a roof structure, the longevity of the integrity of the entire roof structure is improved.

In each of the above embodiments, the structures of the reinforced roofing structure of the present invention are described separately in each of the embodiments. However, it is the full intention of the inventor of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A roofing underlayment positioned between a roof support structure and an overlayment, comprising:
   a reinforcing scrim of interwoven strands for supporting tensile forces in multiple directions; and
   at least one layer of thermoplastic material affixed to a side of the reinforcing scrim by extrusion lamination for providing a weather-resistant barrier.

2. The roofing underlayment of claim 1, further comprising a layer of slip-resistant material positioned over an outer surface of the roofing underlayment.

3. The roofing underlayment of claim 2, wherein the slip-resistant material is formed from polypropylene.

4. The roofing underlayment of claim 1, further comprising a radiant barrier layer for reflecting solar energy positioned adjacent the layer of thermoplastic material.

5. The roofing underlayment of claim 4, wherein the radiant barrier layer is a metalized film.

6. The roofing underlayment of claim 4, wherein the radiant barrier layer is an aluminum coating applied to the layer of thermoplastic material.

7. The roofing underlayment of claim 1, further comprising a layer of thermoplastic material attached to both sides of the reinforcing scrim.

8. The roofing underlayment of claim 1, wherein the thermoplastic layer is a film-forming polymer.

9. The roofing underlayment of claim 8, wherein the layer of thermoplastic layer is extruded onto the reinforcing scrim.

10. The roofing underlayment of claim 1, wherein the thermoplastic layer may include polyethylene or polypropylene.

11. The roofing underlayment of claim 1, wherein the interwoven strands comprise a thermoplastic polymer.

12. The roofing underlayment of claim 11, wherein the thermoplastic polymer strands are formed from one of polyethylene, polypropylene, polyester, and nylon.

13. The roofing underlayment of claim 11, wherein the thermoplastic polymer strands comprise oriented polypropylene.

14. The roofing underlayment of claim 11, wherein the thermoplastic polymer strands comprise cross-laminated polyethylene tapes.

15. The roofing underlayment of claim 1, wherein a thermoplastic layer is affixed to both sides of the reinforcing scrim.

16. The roofing underlayment of claim 15, wherein the thermoplastic layers are co-extruded over both sides of the reinforcing scrim.

17. The roofing underlayment of claim 1, wherein the reinforcing scrim comp rises a mesh of individual, cross-laminated strands.

18. The roofing underlayment of claim 4, wherein the radiant barrier layer satisfies the standards of emissivity and reflectivity set forth in procedure ASTM E-408 of the American Society of Testing Materials.

19. The roofing underlayment of claim 1, wherein the roofing underlayment provides for passive ventilation of air while providing a waterproof barrier.

20. The roofing underlayment of claim 1, wherein the thermoplastic layer includes micro-perforations which allow the passage of air therethrough while preventing moisture from passing therethrough.

21. A multi-layer waterproofing membrane for providing a weather-resistant barrier, comprising:

a reinforcing scrim of cross-laminated thermoplastic strands for supporting tensile forces in multiple directions; and a layer of thermoplastic material extruded to cover each side of the reinforcing scrim, wherein the thermoplastic material provides a waterproof barrier, wherein the waterproofing membrane is positioned between a roof support structure and an overlayment.

22. The multi-layer waterproofing membrane of claim 21, further comprising a layer of slip-resistant material positioned over an outer surface of the waterproofing membrane, wherein the slip-resistant layer resists slipping in both wet and dry conditions.

23. The multi-layer waterproofing membrane of claim 22, wherein the slip-resistant material is formed from polypropylene.

24. The multi-layer waterproofing membrane of claim 21, further comprising a radiant barrier layer for reflecting solar energy positioned adjacent to one of the layers of thermoplastic material.

25. The multi-layer waterproofing membrane of claim 24, wherein the radiant barrier layer is a metalized film.

26. The multi-layer waterproofing membrane of claim 24, wherein the radiant barrier layer is an aluminum coating applied to one of the layers of thermoplastic material.

27. The multi-layer waterproofing membrane of claim 21, wherein the thermoplastic layers are co-extruded onto the reinforcing scrim.

28. The multi-layer waterproofing membrane of claim 21, wherein the thermoplastic layers may include polyethylene or polypropylene.

29. The multi-layer waterproofing membrane of claim 21, wherein the scrim comprises a mesh of individual, cross-laminated strands of thermoplastic.

30. The multi-layer waterproofing membrane of claim 21, wherein the thermoplastic strands are formed from one of polyethylene, polypropylene, polyester, and nylon.

31. The multi-layer waterproofing membrane of claim 21, wherein the thermoplastic strands comprise oriented polypropylene.

32. The multi-layer waterproofing membrane of claim 21, wherein the thermoplastic strands comprise cross-laminated polyethylene tapes.

33. The multi-layer waterproofing membrane of claim 24, wherein the radiant barrier layer improves the fire resistance of the multi-layer waterproofing membrane.

34. A roofing underlayment positioned between a roof support structure and an overlayment, comprising:

a reinforcing scrim of interwoven strands for supporting tensile forces in multiple directions; and at least one layer of thermoplastic material affixed to a side of the reinforcing scrim for providing a weather-resistant barrier, wherein the thermoplastic layer includes micro-perforations which allow the passage of air therethrough while preventing moisture from passing therethrough.

* * * * *